Oct. 25, 1955 C. T. JACOBS 2,721,907

ELECTRIC-OSCILLATION AMPLIFIERS

Filed Jan. 22, 1949

INVENTOR

Charles T. Jacobs

United States Patent Office 2,721,907

Patented Oct. 25, 1955

2,721,907

ELECTRIC-OSCILLATION AMPLIFIERS

Charles T. Jacobs, Orange, N. J.

Application January 22, 1949, Serial No. 72,131

7 Claims. (Cl. 179—171)

Figures 1, 1A, 1B:
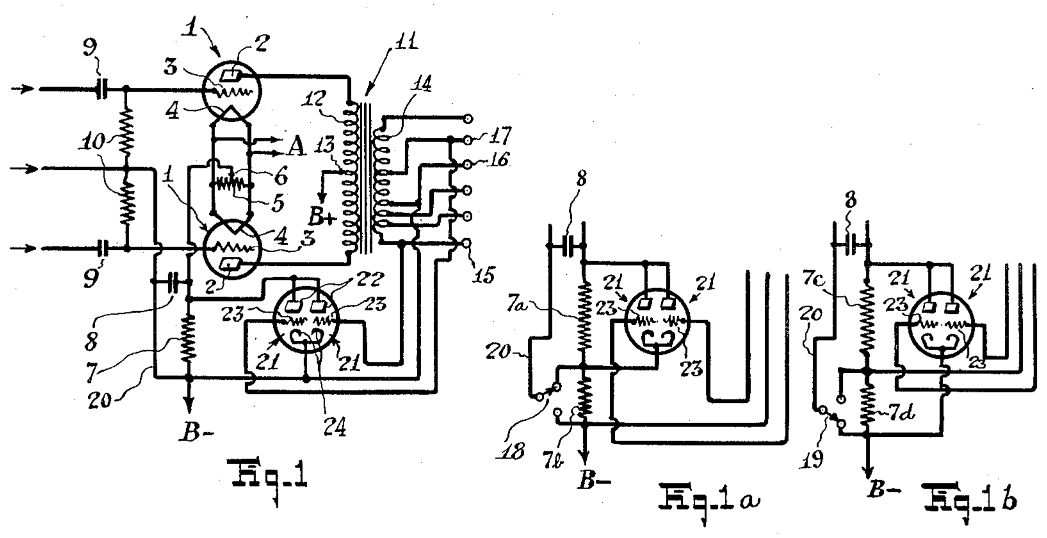

This invention relates to electric-oscillation amplifiers, and in its principal aspects to stages, in those amplifiers, employing a plurality of electron-discharge devices connected in push-pull arrangement.

In such stages it is common practise to employ a grid bias of such an order of magnitude that each individual tube or discharge device is operated on an appreciably curved dynamic plate-current grid-voltage characteristic. The resulting distortion components produced by each device may readily be substantially eliminated, through mutual cancellation, by the push-pull arrangement. When such a bias is employed, however, the push-pull arrangement does not serve to keep the plate current of the stage constant at all signal levels; the D. C. component of that plate current executes an increase with signal level. This of itself is usually not serious; it does, however, result in disadvantages when that plate current is utilized to any appreciable degree in developing the bias voltage for the stage. For in that case the bias becomes subject to increase with signal level; among the resulting disadvantages are a reduction of handling power below, and an increase of distortion by the stage above, those which would characterize the stage in the absence of the variation of bias.

Accordingly it has frequently been the practise, when optimum performance of such a stage is desired, to generate a bias voltage for the stage wholly independently of the plate current of the stage. This has the disadvantages of complexity and cost—beside a serious impairment of dependability, in that if the independent bias-generating means fails for reason (such, purely for example, as removal or burn-out of a rectifier tube employed therein), the push-pull stage may be deprived of all bias, and some of its component elements may be ruined by a resulting grossly excessive flow of plate current.

It is an object of my invention to achieve the benefits available from independent generation of bias voltage for such a stage as abovementioned, but without the disadvantages of such independent generation.

It is an object to provide, for such a stage as abovementioned, a substantially constant bias generated wholly, or to any desired fractional extent, by the plate current of the stage.

It is an object to minimize variations in the bias of such a stage as abovementioned wherein the plate current of the stage is used in the generation of bias.

It is an object to stabilize the current through a resistance traversed by plate current which is subject to increase with signal level.

It is an object to permit the power otherwise wasted in a biasing resistance to be employed for a useful purpose demanding relative constancy of power supply, in spite of substantial variations in the plate current ordinarily traversing that biasing resistance.

Other and allied objects will more fully appear from the following description and the appended claims.

Figure 2:
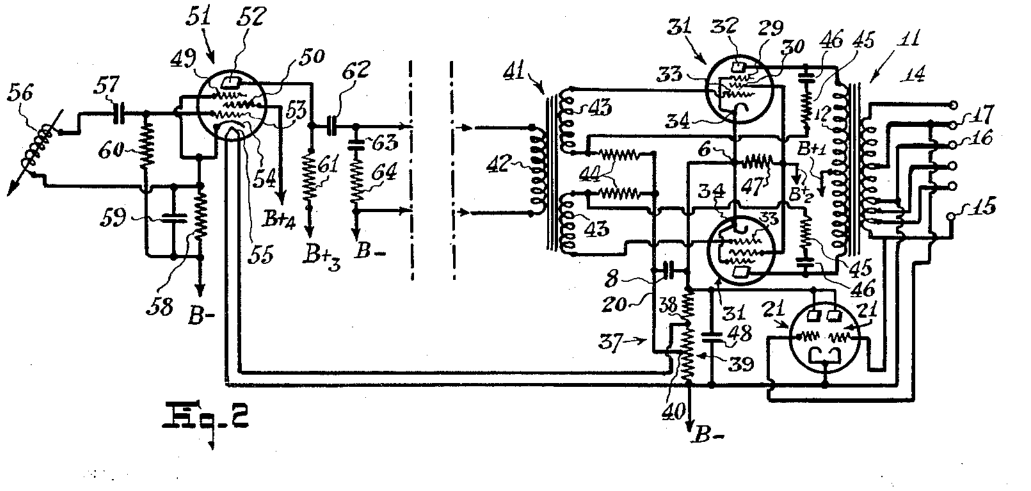

In the description of the invention hereinafter set forth, reference is had to the accompanying drawings, in which:

Figure 1 is a schematic diagram of a simple embodiment of my invention;

Figures *1a* and *1b* are fractional schematic diagrams, each of an optional modification of a portion of Figure 1; and Figure 2 is a schematic diagram of a somewhat modified embodiment of my invention.

In Figure 1 there appear a pair of discharge devices 1, each having a cathode 4, a grid 3 and a plate 2. The cathodes by way of example are shown as filaments connected in parallel with each other and across a suitable source (not shown) of A, or filament-heating, voltage. A cathode terminal for the pair of devices (i. e., a point of connection of the input and output circuits to the cathodes) is shown as the center-tap 6 of a resistance 5 connected in parallel with the filaments which form the cathodes. Between the plates 2 of the respective devices is connected the primary 12 of an output transformer 11, the center-tap 13 of the primary being connected to B+, which will be understood to be the positive terminal of a suitable source (not shown) of plate current for the devices. The cathode terminal 6 may be connected to B— (i. e., to the negative terminal of the plate-current source) through a resistance 7, which may be by-passed by a condenser 8 to minimize the impedance presented between 6 and B— at signal frequencies.

Signal voltages of equal magnitudes but of mutually opposed phases may be applied between the respective grids 3 and the cathode terminal 6 from any suitable preceding apparatus (not shown)—for example through respective blocking condensers 9 to the respective grids, and through the condenser 8 (already mentioned) to the cathode terminal 6. A direct or bias voltage negative with respect to the cathodes may be applied to both grids, for example through resistances 10 each connected from B— to a respective one of the grids—it being understood that the magnitude of this bias voltage will be determined by the voltage drop produced by the plate currents of the devices 1 flowing through the resistance 7.

The apparatus as thus described will be recognized as well known in the art—typically, as the output stage of an amplifier, a loudspeaker (not shown) typically being connected to terminals of the secondary 14 of the output transformer between which there is presented an impedance appropriate to that of the loudspeaker.

It is well understood that in such a push-pull amplifier stage the bias voltage for the grids of the devices 1 may be chosen (relative to the B+ voltage) low enough, and the zero-signal plate current (i. e., plate current in the absence of signal impression on the grids) thus made high enough, so that the average combined plate current of the devices 1 will not increase greatly with increasing signal level. The devices 1 are then being operated on essentially a straight dynamic plate-current grid-voltage characteristic. Such operation, however, not only results in a steady high plate-current demand but also, with any given tube type used for the devices 1, requires that the plate voltage be limited (lest the permissible plate dissipation be exceeded) to materially less than would be permissible with a higher bias voltage. It is therefore very common to choose a higher bias voltage, with a consequent lower zero-signal plate current—but also with the result that the mean plate current will increase appreciably with increasing signal level. Average plate-current demand is then reduced; higher plate voltages may be used with resulting increase of handling power; and the devices 1 are then being operated on a more or less curved dynamic plate-current grid-voltage characteristic. The push-pull arrangement is then being relied on to substantially eliminate distortion components, which of course are generated by each individual device 1, from the signal in secondary 14.

In any case wherein the mean plate current increases with increasing signal level and is used as a significant determinant of the bias voltage (as in Figure 1, wherein it is the sole such determinant) the bias will increase with increasing signal level. This usually (and more especially the further be the departure from straight-dynamic-characteristic operation) results in a reduction of the handling power of the stage below that which would be available, and an increase of the distortion over that which would occur, in the absence of such a bias increase. According to my invention I avoid the bias increase and the resulting handling-power reduction and distortion increase—while retaining the simplicity and dependability of the arrangement in which the stage's own plate current largely or wholly generates its bias, and avoiding the complexity, cost and dangers of the substitute procedure of fixedly biasing the grids.

I stabilize the bias voltage by means which are actuated by, or responsive to, output signal components from the devices 1. In the structure of Figure 1 I may connect across the resistance 7 the discharge paths of a pair of supplementary discharge devices 21, as by the illustrated connections of both their plates 22 to the cathode terminal 6 and of both their cathodes 24 to B—; and between the grids of these devices 21 and their cathodes I may apply, from the output transformer secondary 14, signal voltages of mutually equal amplitudes but mutually opposed phases, as by the illustrated connections of the respective grids 23 to the secondary terminals 15 and 17, and of both the cathodes 24 to the intervening secondary terminal 16. (The devices 21 may conveniently be the individual sections of a "twin-triode" tube, for which reason I have typically illustrated them as contained in a single envelope.)

In the structure so described the plate voltage effectively applied to the supplementary devices 21 is the bias voltage for the devices 1, while the grid bias voltage applied to the supplementary devices is zero. The supplementary devices 21 may typically be of medium-high mu (e. g. 35). Under zero-signal conditions each of these devices will pass a relatively small plate current—the necessary small allowance for which is readily made in establishing the value of 7 (at a value slightly higher than it would have been in the absence of the devices 21). At extremely small signal levels the plate current of each device 21 will be alternately lowered and raised by a very small amount (each in a cycle coextensive with the signal cycle, but in phase opposition as between the two devices), with negligible change of the combined device-21 plate current from the zero-signal condition. But as the signal level becomes appreciable the normally small plate current of each device 21 will be alternately cut off and appreciably increased (each in a cycle, and in a phase relation to the other, as above stated)—with the result that the combined device-21 plate currentwill be appreciably increased, twice in (i. e., at each of the peaks of) each signal cycle. The amplitude of this bicyclic increase of combined device-21 plate current for any given signal level is readily controlled by proper choice of the magnitude of the secondary winding portions lying between 15 and 16 and between 16 and 17.

The frequency and phase characteristics of the bicyclic increase of combined device-21 plate current are very nearly ideally suited to the maintenance of a constant current through and voltage across 7. For the increase of the current tending to flow through 7—i. e., of the combined plate currents of the devices 1—is itself a bicyclic increase having positive peaks occurring simultaneously with each peak (positive and negative) of the signal; the same is true of the combined device-21 plate current, which accordingly can absorb the increases of current tending to flow through 7 (i. e., can divert those increases around, and thus keep them out of, that resistance). The waveform of the A. C. component of the combined device-21 plate current (which is intermediate between a smooth double-frequency signal wave and a full-wave-rectified signal wave) doubtless exhibits slight departures from the waveform of the A. C. component of the combined device-1 plate-current increase; but the net A. C. component through and voltage across 7 is rendered vastly less than in the absence of the devices 21—in other words, is far less than in conventional stages.

The remarks and comparisons of the preceding paragraph may be taken as applicable even with condenser 8 omitted (in comparative contexts, omitted both from the disclosed and from the conventional structure). This condenser, then, while its use is preferred, actually is much less relied on with the disclosed than with the conventional structure.

It remains to be noted that the amplitude of the bicyclic increase of combined device-21 plate current, having been suitably established at one signal level by choice of the portions of secondary 14 to which to connect grids 23, is found to remain essentially proper at all signal levels. Here again precise identity between the behaviors of the two increases (i. e., that of combined device-21 plate current and that of combined device-1 plate current) is doubtless slightly departed from—the device-1 increase probably being more nearly a full second-power function of signal level than is the device-21 increase (though the latter is distinctly greater than a first-power function). I have, however, readily chosen the connected-to portions of secondary 14 so as to hold the current through and voltage across 7 in typical cases to a variation, over the range from zero to full signal level, of the order of ±2%—which, for all practical purposes, is functionally indistinguishable from full constancy.

By way of example I may here note that with 2A3's as the devices 1, operating at a plate voltage of approximately 325 and a bias voltage of approximately 68 and working into a plate-to-plate load of approximately 4,000 ohms, I have satisfactorily employed for the devices 21 the two sections of a 6N7 tube and, for the windings lying between 15 and 16 and between 16 and 17, windings each developing very approximately 1/11 of the voltage appearing across the entire primary 12—e. g., that entire primary being rated at 4,000 ohms, windings each rated at very approximately 33 ohms. Independently, with 6BG6–G's connected as triode as the devices 1, operating at plate voltage of approximately 350 and bias voltage of approximately 37 and working into a plate-to-plate load of approximately 8,000 ohms, I have satisfactorily employed for the devices 21 the same two sections of a 6N7 tube, with windings 15—16 and 16—17 again each developing approximately 1/11 of the voltage appearing across the entire primary.

Finally, it is to be noted that the grid circuits of the devices 21 do draw power from the output transformer—a drain which, in principle, could be disadvantageous either in an absolute sense, or in the sense of causing distortion, or both. Absolutely, however, the power loss is a very minor fraction of a decibel. (With the 6N7 tube I have mentioned above there will be a current diversion from secondary 14 of the order of 2½%; if there be made the slight readjustment of the output-transformer ratio necessary to keep the net plate-to-plate load unchanged from the conventional case, the power loss will be about 2½%, or about .1 of a decibel; while if that readjustment be not made, the power loss will actually be even less, since the slight extra loading by devices 21 will cause the load to reduce very slightly toward equality with the triode plate impedance. Still lower losses may be achieved with some of the newer high-conductance medium-high-mu double triodes such as the 6J6, which require a smaller grid voltage from secondary 14.) And this relatively minute power abstraction by the device-21 grid circuits is, in its loading effect on the output transformer, fundamentally cyclic. While it involves some odd higher harmonics, they are of minor degree; thus only a minor fraction, of an already minute power abstraction, represents distortion—which, as expectable, cannot be detected in any practical sense.

As above stated, in the structure of Figure 1 the bias applied to the grids of the devices 21 (relative to their cathodes) is zero and, in spite of their relatively low effective plate voltage, there will be a small plate-current flow through those devices at zero signal level. I have not found this disadvantageous—the value of resistance 7 of course being, as above suggested, chosen to allow for this flow. If desired, however, a negative bias may be applied to these grids. This is readily done by such an arrangement as I have illustrated in Figure 1*a* (which is intended for optional substitution for the lower part of Figure 1). Herein the changes from the Figure -1 structure are that the resistance 7 is subdivided into an upper resistance 7*a* and a lower resistance 7*b*; the connection from the output-transformer-secondary terminal 16 is still made to full B— (the lower end of 7*b*), but the cathodes of the devices 21 are connected to the junction between 7*a* and 7*b*. The grid return 20 of the devices 1 (e. g., the conductor leading from the non-grid extremities of the resistances 10) may optionally be made to either extremity of resistance 7*b* (as indicated by the showing of a switch 18, which it will be understood would not in practise be used)—the appropriate value for 7*a* varying slightly between the two possible connections, as will be understood. In this arrangement the grids of the devices 21 will be biased negatively by the voltage drop in 7*b*; a relatively small value for this resistance will be sufficient to result in zero plate current in the devices 21 at zero signal level. Because the device-21 grid current (as well as device-1 plate current) will flow through the resistance 7*b* the bias of the device-21 grids will undergo a bicyclic increase, which will oppose to some extent the effect of the signal applied to the grids and may necessitate the application to those grids of somewhat higher signal voltages from the output-transformer secondary 14.

The application of a small negative bias to the grids of the devices 21 will have an effect on the behaviour of the combined device-21 plate-current increase with signal-level increase. In general, it will tend to make that increase approach more closely (though not all the way) to a first-power function of signal level that does that increase in the case of Figure 1. By applying a higher negative bias (as by making higher the value of 7*b*) an approximation of a higher-power function—caused by complete inaction of the devices 21 until a certain minimum signal level is reached—may be achieved. Another way, not characterized by such a discontinuity, in which to cause the combined device-21 plate-current increase to approach more nearly a second-power function of signal level than it does in the case of Figure 1, is to bias the grids of the devices 21 somewhat positively with respect to the cathodes. This has been illustrated in Figure 1*b* (which also is intended for optional substitution for the lower portion of Figure 1). Herein the changes from the Figure-1 structure are that the resistance 7 is subdivided into an upper resistance 7*c* and a lower resistance 7*d*; the connection from the cathodes of the devices 21 is still made to full B—, but the connection from the output-transformer-secondary terminal 16 is now made to the junction between 7*c* and 7*d*. The grid return 20 of the devices 1 may optionally be made to either extremity of resistance 7*d* (as by switch 19, analogous to 18 of Figure 1*a*)—the appropriate value for 7*c* varying between the two possible connections, as will be understood, and being in any event higher because of more substantial zero-signal plate currents in the devices 21.

It will be understood that while I have shown, in Figures 1*a* and 1*b*, arrangements for finitely biasing the grids of the supplementary devices 21 and have above pointed out that such arrangements may be employed to alter the behaviour of the combined device-21 plate-current increase with signal-level increase, nevertheless I have not ordinarily found it necessary to resort to those arrangements—the zero-bias operation of the devices 21 as shown in Figure 1 having proven quite satisfactory in typical cases.

My invention is in no sense limited to the details of the environment in which it has been illustrated in Figure 1. Thus by way of example I have illustrated it in Figure 2 with unipotential-cathode signal-amplifying discharge devices; with such devices in the form of pentodes rather than triodes; with a transformer, rather than a resistance-condenser, input coupling to those discharge devices; with those discharge devices equipped with inverse feedback; with the biasing system for those devices traversed by current additional to their own plate currents; etc.

Figure 2 the signal-amplifying discharge devices are pentodes 31 (the term "pentodes" being of course intended to include beam power tubes) having unipotential cathodes 34 heated by heaters not necessary to show. Each of these devices further has the signal grid 33, the screen 30, the suppressor (or beam-forming plates) 29, and the plate 32 (some of these numerals having been applied only to the upper-shown one of the devices, in the interest of clarity of the drawing). Between the plates 32 of the devices 31 there is connected the primary 12 of the output transformer 11. The common connection of the cathodes 34 of the devices is designated as 6 in analogy to the cathode connection of Figure 1; it may be connected to B— through the resistance system 37 hereinafter more fully described. The grid return for the grids (33) of the signal-amplifying discharge devices is again designated as 20, being connected into the resistance system 37 as hereinafter more fully described; it is shown as by-passed to the cathode connection 6 by the condenser 8.

Signal voltages of mutually equal amplitudes but mutually opposed phases are applied between the grids 33 and the cathode connection 6 from respective secondaries 43 of an input transformer 41. A first terminal of each secondary 43 is connected to a respective one of the grids, while the second terminal of each secondary is connected (through a respective resistance 44 hereinafter mentioned) to the common grid return 20 (from which the signal voltage reaches 6 through condenser 8). Signal voltage is applied to the primary 42 of the transformer 41 by any convenient means not necessary to show.

The center tap of the output-transformer primary 12 is shown as connected to $B+_1$, which may for example designate a maximum B+ potential. The screens 30 of the devices 31 are shown as connected in common to $B+_2$, which may designate a B+ potential equal to or somewhat lower than $B+_1$. Inverse feedback has been shown in connection with each of the devices 31, by the respective blocking condenser 46 connected to the plate of the device, and the respective resistance 45 connected therefrom to the transformer end of the respective resistance 44.

Excepting for the details of the resistance system 37 and the connection thereinto of the grid return 20, the apparatus of Figure 2 as thus far described will be recognized as known in the art. To the push-pull stage which this apparatus constitutes, my invention is fully applicable. Thus in Figure 2 the discharge paths of a pair of supplementary discharge devices 21, the input circuits of those devices, and the output-transformer secondary 14 may be connected between each other and with the resistance system 37 in manner similar to their interconnection and connection to the resistance 7 in any of the earlier figures—typically, to their interconnection and connection to resistance 7 in Figure 1.

The resistance system 37 of Figure 2, for a purpose hereinafter mentioned, is shown as comprising an upper resistance 38, a lower resistance 39, and a resistive element (hereinafter mentioned) in shunt to 39. The connection of the grid return 20 into the resistance system is shown as made at point or tap 40 in resistance 39, finitely removed from the lower (B−) extremity of the resistance system. This resistive separation of 40 from the lower extremity of 37 is preferred in the case of pentode signal-amplifying discharge devices. Such devices in general require a lower order of grid bias than do triodes. If this lower bias be achieved by using a resistance system 37 of value only great enough to develop that required bias and no more, the supplementary devices 21 will be operated at a very low effective plate voltage. This both reduces their effectiveness (i. e., would require the application to their grids of greater signal voltage from the output-transformer secondary) and, with typical tubes for 21, results unnecessarily large grid-current flow (would do so even if the signal voltage applied to the grids were not increased, and does so all the more when it is increased). I therefore prefer with pentodes to use, as shown, a resistance system 37 of value materially greater than enough to develop the required bias for the devices 31, and to abstract the bias required for those devices from the resistance system by means of an appropriately placed tap 40. In general this means developing across the resistance system 37 a voltage drop of that greater order of magnitude which would be required for triodes, but utilizing only that portion which is appropriate for the pentodes actually being used. Since the underlying function of the supplementary devices 21 is performed on a current (rather than a voltage) basis, it will be understood that that function is still performed analogously to its performance in earlier figures.

It is to be understood that my invention, whether employed with triodes or with pentodes, is not limited to cases wherein the biasing resistance system is traversed solely by plate current from the push-pull stage whose bias is being generated therein. Such a limitation is wholly unnecessary, since an underlying feature of the stabilization of bias in the above described embodiments of my invention is the diversion from the biasing resistance system of a numerical, rather than a geometric or proportionate, excess of current which tends to flow therethrough at higher signal levels; obviously the magnitude of the zero-signal current through that system has no first-order effect on the diversion of a numerical excess. Accordingly, by way of example in Figure 2, I have shown a resistance 47 connected between a B+ potential (purely typically in Figure 2, $B+_2$) and the cathode connection 6—it being understood that this resistance 47 broadly typifies any current path or paths through which there may be impressed into the biasing resistance system a relatively fixed current, large or small, over and above the plate current of the push-pull stage whose bias is being derived from the resistance system.

With either triodes or pentodes as the signal-amplifying discharge devices, I have found that the stabilization of grid bias for the signal-amplifying discharge devices according to the above described embodiments of my invention affords an otherwise unavailable opportunity in connection with high-gain amplifiers. I refer to amplifiers of which a push-pull stage such as I have shown in Figure 1 or Figure 2 is a late (typically, the final) stage, and in which an early (typically, the first) stage is operated at such a low signal level that hum difficulties are encountered when the cathode of the discharge device used in that early stage is heated by a heater energized by alternating current. In such a case it is a helpful expedient to energize the early-stage cathode-heater by power produced by plate-supply current—an obviously efficient source of which is power otherwise wasted in the biasing resistance system of a late (and thus relatively high-powered) push-pull stage. But this cannot be used as a source of such power if the current through and voltage across it are subject to substantial variation with signal level—for if they are, either the early-stage cathode-heater will be overenergized and burned out at high signal levels, or it will be underenergized at low signal levels, or both. Since my invention as above described stabilizes the current through and voltage across the biasing resistance system of the push-pull stage, the power in that system may safely and effectively be used to energize the early-stage cathode-heater. Practically, of course, that heater will be connected to form a portion of that system; this I have illustrated in Figure 2.

In Figure 2, 51 designates the discharge device of an early (typically, the first) stage of the amplifier. It may for example be a pentode having cathode 54, signal grid 53, screen 50, suppressor 49 (for example externally connected to cathode 54) and plate 52, and having the cathode-heater 55. Typically, its input circuit has been shown as formed by blocking condenser 57 and a low-level magnetic phonographic pick-up 56 serially connected between grid 53 and cathode 54. The cathode may be elevated (for example by a fraction of a volt) above B− potential by connection to the latter through resistance 58 bypassed by condenser 59; the B− potential, thus rendered slightly more negative than cathode potential, may be applied to grid 53 through high resistance 60. The plate 52 may be supplied with current from a B+ potential (designated as $B+_3$, and preferably of relatively high value) through the relatively high resistance 61, while the screen may be connected to a lower B+ potential (designated as $B+_4$, and typically of the order of 30 volts). The signal-output circuit of the stage may be formed by negligible-impedance blocking condenser 62, and (when used with a pick-up such as abovementioned) by the serially arranged condenser 63 and resistance 64 connected from 62 to B− potential and from across which signal voltage may be applied to succeeding portions of the amplifier. It may here be mentioned that the serially arranged 63 and 64 effectively form the lower or output portion of a potentiometer system of which the entirety is serially formed by them and the parallel value of 61 with the output impedance of the discharge device 51; the signal input is effectively applied across the whole potentiometer, while the output is taken from across 63—64. If 63 is chosen so that its impedance at a very low frequency (e. g., 25 cycles) is of the order of the parallel value last-mentioned, and the resistance of 64 is made equal to the impedance of 63 at a medium frequency (e. g., 400 cycles) the stage will provide a relatively constant amplification from that frequency upward and a steadily rising amplification from that frequency downward—a requisite for proper output from typical low-level magnetic phonographic pick-ups. With a device 51 having a mutual conductance, as operated, of the order of 2,000 micromhos, it is readily possible to achieve, from across 56 to across 63—64, a gain of the order of 10 to 15 times at the higher frequencies and only a little more at the chosen medium frequency, but rising to the order of 150 at extremely low frequencies.

Facilitation of the energization of heater 55 of the device 51 is the purpose of the abovementioned subdivision of the resistance system 37 into the resistances 38 and 39, that heater being the resistive element abovementioned as shunted across 39. The arrangement of course postulates that the zero-signal current flowing through the resistance system 37 will be at least minutely greater than the current to be supplied to heater 55, in which event resistance 39 would be of very high value. (This resistance could on principle be eliminated altogether if the current through 37 were just enough for 55; but it would then be impossible to establish the tap 40 when needed within the heater potential range, and furthermore any open circuiting of 55 or a removal of 51 from its socket would undesirably open the entire push-pull stage plate-current circuit.) The current through the resistance system 37 may of course be as much greater (than sufficient for 55) as desired, with a correspondingly lower choice of value for 39.

By way of example I may mention the use of 6L6 tubes for the devices 31, with a combined zero-signal plate current of approximately 88 milliamperes; the omission of any current path such as 47; and the use for the device 51 of a 26A6 tube (calling for heater excitation with approximately 27 volts and 70 milliamperes; this tube is a variable-mu type, but this is of no disadvantage at the extremely low signal levels encountered in the typical use disclosed). The resistance 39 would then be of the order of 1,500 ohms and would be traversed by approximately 18 milliamperes. Such a zero-signal plate current as abovementioned for the devices 31 calls for operation thereof at plate and screen potentials (relative to cathode potential) of 360 and 270, respectively, and a grid bias (relative to cathode potential) of 22½ volts. Typically 17½ of the required 22½ volts bias may be developed by the passage of the 88 milliamperes through the upper resistance 38, which would accordingly be of the order of 200 ohms; while 5 volts may be developed between the junction of 38—39 and the tap 40 (which would call for subdivision of resistance 39 by tap 40 in the ratio of 5:22). In such operation the total voltage across the resistance system 37 would be of the order of 44½ volts, which is ample for proper behaviour of typical tubes used for the supplementary discharge devices 21.

In Figure 2 the condenser 8 again by-passes the grid return 20 to the cathode connection 6; but when the grid return is connected to a point (e. g., 40) in the resistance system 37, rather than to B—, the condenser 8 does not by-pass that entire system. It may then be desirable to employ another condenser 48 by-passing the entirety of 37, as has been indicated in Figure 2. It will be understood, however, that either 8 or 48 may in specific instances be omitted, and that their inclusion broadly illustrates the use of such by-passing in association with the resistance system as may be found expedient.

I claim:

1. An electric-oscillation amplifier comprising, in combination, a pair of discharge devices, each having a grid, connected in push-pull arrangement, the combined plate current of said devices being subject to increase with oscillation level through a useful oscillation-level range; an output circuit in which fundamental output oscillations from both of said devices are combined in aiding phase relationship; a resistance traversed by said combined plate current; means, connected between said grids and said resistance, for impressing bias voltage from across said resistance onto said grids; and means, connected with said output circuit and actuated by said combined output oscillations therein, for effecting a diversion of plate-current increase from said resistance, whereby to minimize variation of the current through said resistance.

2. An electric-oscillation amplifier comprising, in combination, a pair of discharge devices, each having a grid, connected in push-pull arrangement, the combined plate current of said devices being subject to increase with oscillation level through a useful oscillation-level range; an output circuit in which fundamental output oscillations from both of said devices are combined in aiding phase relationship; another discharge device having a cathode-heating element and having an output circuit connected with and supplying oscillations to said first-mentioned pair of discharge devices; resistance, comprising said cathode-heating element, traversed by said combined plate current; means, connected between said grids and said resistance, for impressing bias voltage from across said resistance onto said grids; and means, connected with said output circuit and actuated by said combined output oscillations therein, for effecting a diversion of plate-current increase from said resistance, whereby to minimize variations both of the bias on said grids and of the current through said cathode-heating element.

3. An electric-oscillation amplifier comprising, in combination, a pair of discharge devices, each having a grid, connected in push-pull arrangement, the combined plate current of said devices being subject to increase with oscillation level through a useful oscillation-level range; an output circuit in which fundamental output oscillations from both of said devices are combined in aiding phase relationship; another discharge device having an output circuit connected with and supplying oscillations to said first-mentioned pair of discharge devices; a cathode-heating element included in said other device and traversed by said combined plate current; and means, connected with said output circuit and actuated by said combined output oscillations therein, for effecting a diversion of plate-current increase from said cathode-heating element.

4. An electric-oscillation amplifier comprising, in combination, a pair of discharge devices, each having a grid, connected in push-pull arrangement, the combined plate current of said devices being subject to increase with oscillation level through a useful oscillation-level range; an output circuit in which fundamental output oscillations from both of said devices are combined in aiding phase relationship; a resistance traversed by said combined plate current; means, connected between said grids and said resistance, for impressing a bias voltage from across said resistance onto said grids; and a pair of supplementary discharge devices each having a grid, the discharge paths of said supplementary devices being in parallel relation to said resistance, and the grids of said supplementary devices being respectively connected with points of mutually opposed phase in said output circuit for actuation in mutually opposed phase by said combined output oscillations.

5. An electric-oscillation amplifier comprising, in combination, a pair of discharge devices, connected in push-pull arrangement, the combined plate current of said devices being subject to increase with oscillation level through a useful oscillation-level range; an output circuit in which fundamental output oscillations from both of said devices are combined in aiding phase relationship; a common bias resistance for, and traversed by the combined plate current of, said devices; and means, in shunt to said bias resistance and connected with said output circuit and actuated by said combined output oscillations therein, for effecting a diversion of plate-current increase from said bias resistance.

6. A signal amplifier stage comprising, in combination, a pair of discharge devices connected in push-pull arrangement, the combined plate current of said devices being subject to increase with signal level through a useful signal-level range; an output transformer, having an output winding in which fundamental-frequency output signals from both of said devices are combined in aiding phase relationship, for said stage; a common bias resistance for, and traversed by plate current from both of, said devices; and means, in shunt to said bias resistance and connected with and controlled by said output winding, for effecting a diversion of plate-current increase from said bias resistance.

7. An electric-oscillation amplifier comprising, in combination, a pair of discharge devices, each having a grid, connected in push-pull arrangement, the combined plate current of said devices being subject to increase with oscillation level through a useful oscillation-level range; an output system for said devices, at two points in which there appear output oscillations from said devices in mutually opposed phase; a common bias resistance for, and traversed by the combined plate current of, said devices; and a pair of supplementary discharge devices each having a grid, the discharge paths of said supplementary devices being in shunt relation to said resistance and the respective grids of said supplementary devices being connected respectively to said two points in said output system for actuation by output oscillations of mutually opposed phase.

(References on following page)

References Cited in the file of this patent

UNITED STATES PATENTS

| | | |
|---|---|---|
| 1,948,977 | Aiken | Feb. 27, 1934 |
| 2,073,477 | Green | Mar. 9, 1937 |
| 2,093,072 | Cooper | Sept. 14, 1937 |
| 2,115,854 | Hofer | May 3, 1938 |
| 2,135,562 | Cousins | Nov. 8, 1938 |
| 2,226,746 | Schulze-Herringen | Dec. 31, 1940 |
| 2,231,863 | Clay | Feb. 18, 1941 |
| 2,259,471 | Jahns | Oct. 21, 1941 |
| 2,369,066 | Maxwell | Feb. 6, 1945 |
| 2,462,849 | Dishal et al. | Mar. 1, 1949 |
| 2,505,254 | Mesner | Apr. 25, 1950 |
| 2,542,160 | Stoner et al. | Feb. 20, 1951 |
| 2,547,538 | Rieke | Apr. 3, 1951 |
| 2,554,987 | Hogle | May 29, 1951 |
| 2,595,444 | Becker | May 6, 1952 |

FOREIGN PATENTS

| | | |
|---|---|---|
| 408,269 | Great Britain | Apr. 4, 1934 |
| 540,834 | Great Britain | Oct. 31, 1941 |